| United States Patent [19] | [11] | 4,339,466 |
|---|---|---|
| Van Gheluwe et al. | [45] | Jul. 13, 1982 |

[54] ANTI-FOAMING AGENT FROM MALT

[75] Inventors: George E. A. Van Gheluwe, Longueuil; Robert L. Weaver; Miroslav Dadic, both of Montreal, all of Canada; Finn B. Knudsen, Hellerup, Denmark

[73] Assignee: The Molson Companies, Limited, Rexdale, Canada

[21] Appl. No.: 182,022

[22] Filed: Aug. 26, 1980

Related U.S. Application Data

[63] Continuation-in-part of Ser. No. 10,059, Feb. 7, 1979, abandoned.

[51] Int. Cl.³ .................. A23L 1/28; C12C 11/04; C12B 1/18
[52] U.S. Cl. .................. 426/430; 426/16; 426/329; 426/429; 426/655
[58] Field of Search ............. 426/16, 329, 429, 430, 426/655

[56] References Cited

U.S. PATENT DOCUMENTS

| 3,751,263 | 8/1973 | Hall | 426/16 |
| 3,870,810 | 3/1975 | Humphrey | 426/429 X |
| 4,110,480 | 8/1978 | Pollock et al. | 426/430 |

OTHER PUBLICATIONS

Roberts, R. T., Use of an Extract of Spent Grains as an Antifoaming Agent in Fermentors, J. Inst. Brew, vol. 82, 1976 (p. 96).

*Primary Examiner*—David M. Naff
*Attorney, Agent, or Firm*—Hedman, Casella, Gibson & Costigan

[57] ABSTRACT

An antifoaming agent for reducing foaming during fermentation is produced by extracting ground malt with an ethanol solution having an ethanol concentration in excess of 75% to produce an ethanolic extract, separating the ethanolic extract from the ground malt and concentrating the ethanolic extract to obtain the antifoaming agent. The anti-foaming agent is particularly advantageous for use in fermentation of beer wort since it constitutes only constitutents normally in beer.

7 Claims, 1 Drawing Figure

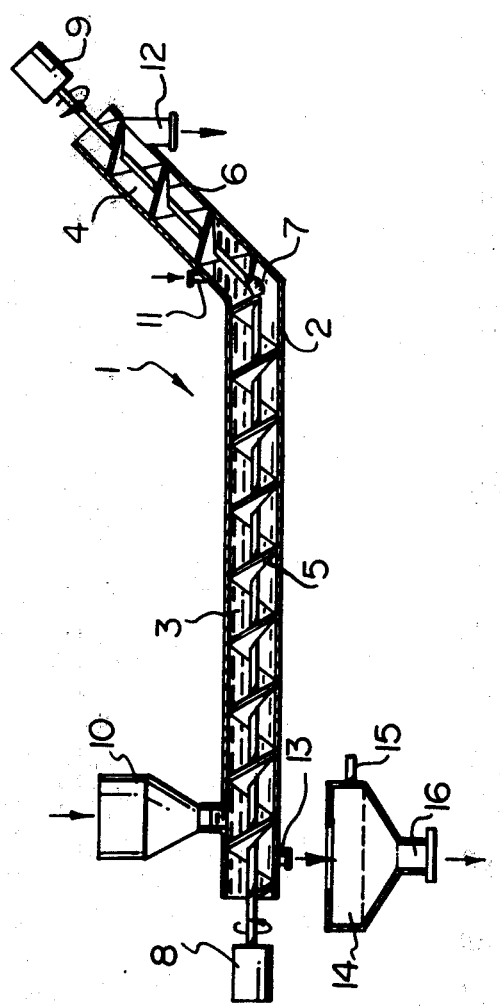

ANTI-FOAMING AGENT FROM MALT

The subject application is a continuation-in-part of application Ser. No. 10,059 filed Feb. 7, 1979, now abandoned.

This invention relates to a process for producing an anti-foaming agent and to an agent produced by such process. The agent is intending to reduce foaming during fermentation, such as ale and lager fermentations and particularly during the former.

The effect of foaming on fermentation processes are well known. There are presently available many antifoaming agents and methods such as, for example that disclosed by U.S. Pat. No. 2,085,705, which issued to I. G. Farbenindustrie AG on June 29, 1937. The I. G. Farbenindustrie patent discloses a method of combating foam during fermentation using a liquid mixture of a solid alcohol (more than 12 carbon atoms) and a liquid aliphatic alcohol (at least 8 carbon atoms per molecule). U.S. Pat. No. 2,762,780, which was issued to S. E. Kulakow on Sept. 11, 1956 discloses an antifoam composition including sugar cane oil, an oil-soluble emulsifier, and possibly an oil-miscible fluidizing carrier.

U.S. Pat. Nos. 3,249,515 and 3,354,050 both of which issued to K. Rungaldier et al on May 3, 1966 and Nov. 21, 1967, respectively are general interest because they disclose a method and an apparatus for controlling foaming by removing waste gas from a culture medium, separating entrained medium from the gas and adding an antifoaming agent to the culture medium in accordance with the rate of separation of entrained medium. However, the patents do not disclose any specific antifoaming agent.

A review of the above art makes it readily apparent that a need exists for a simple, effective antifoaming agent, preferably one which is food compatible.

The object of the present invention is to provide an anti-foaming agent and a process for producing the agent, the process being relatively simple and the agent being food compatible according to all criteria.

Thus, the invention relates to a process for producing an agent for reducing foaming during fermentation comprising the steps of grinding malt; extracting the ground malt with ethanol having a concentration in excess of 75% to yield extracted ground malt and an ethanolic extract; separating said ethanolic extract from any residual ground malt; and concentrating said ethanolic extract to yield said antifoaming agent. The invention also relates to the product produced by such process, namely an agent for reducing foaming during fermentation comprising an extract of ground malt produced by extracting the ground malt with ethanol having a concentration in excess of 75%.

R. T. Roberts reported in the J. Inst. Brew, Vol. 82,96 (1976) that an antifoam agent extracted from spent grain is very efficient in controlling the foam head during fermentation. Applicants have carried out experiments using spent grains from a pilot plant in which the liquid was squeezed out manually, concentrated using a rotary evaporator, and the residue was extracted with a mixture of methanol:chloroform (1:1). After a triple extraction, the extract was filtered through a coarse filter and concentrated to an oily emulsion. The emulsion was suspended in water and tested as an antifoaming agent in fermentations conducted in 2.5 L tubes of 5 cm internal diameter. It was established that 1 ml of this antifoaming agent reduced a foam head to 3 cm from 16 cm in a control experiment.

An attempt to prepare antifoaming agent using industrial grain press effluent for the extraction failed, because an oily emulsion with no antifoaming properties was obtained. Analysis showed that the majority of the fatty acids were saturated, whereas agent produced from fresh spent grains from the pilot plant contains a relatively high percentage of unsaturated fatty acids. Another interesting fact is that lipoxidase activity reduces antifoaming activity due to lipids. For example, grain-press effluents as such extracted with methanol-chloroform demonstrate virtually no antifoaming activity. This is due to oxidation. It has been found that antifoaming activity can be derived from fresh spent grains only. Moreover, the ethonolic extract of ground malt is 3-4 times as effective in reducing foam as fresh spent grain of the same total lipid content. While spent grains contain large amounts of water, ground malt typically contains less than 5% moisture.

The obvious drawback of such an antifoaming agent produced by methanol-chloroform extraction is that it is not food compatible due to traces of chloroform and methanol which pass into beer.

An experiment pilot plant fermentation was carried out with antifoaming agent added to one fermenter and none in a control. Similar foam values were obtained in each case, while beer produced with added antifoaming agent showed higher bitter units by 3 ppm as well as a better chill stability.

The invention will now be described in greater detail with reference to the accompanying drawing, which is a schematic, longitudinal sectional view of an extractor for use in the process of the present invention.

In pilot plant tests, malt is ground using a "MIAG" mill (available from Braunschweig), which is a standard instrument in malt analysis. Plant scale mills are very similar in construction. The sieve analysis of the ground malt used in the pilot plant experiments is as follows:

Mesh size (%): 14(38%); 30(42%); 60(10%); 100(4%); fine flour (6%).

With reference to the drawing, the extraction of the ground malt is carried out in a counter-current, screw-type extractor generally indicated at 1. The extractor 1 includes an elongated casing 2, with a horizontal inlet end 3 and an upwardly inclined outlet end 4. A pair of augers 5 and 6 are rotatably mounted in the inlet and outlet ends 3 and 4, respectively of the casing 2. The augers 5 and 6 are interconnected by a flexible compling 7, and are driven in synchronism by motors 8 and 9.

Ground malt is introduced into the casing 2 via a hopper 10, and 95% ethanol at 50° C. is introduced through an inlet duct 11. The malt weight to ethanol volume is 1 kg of malt per 2.5 liters of ethanol. If necessary, the casing 2 is heated to maintain the ethanol at 50° C. Extracted ground malt is discharged from the outlet end 4 of the casing through an outlet duct 12, and ethanolic extract is discharged through another outlet duct 13 at the other end of the casing 2 into a vibrating screen separator 14, which contains a 200 mesh screen. The products of the separator 14 are a fine malt flour, which is discharged via an outlet 15 and screened ethanolic extract. Screened ethanolic extract is discharged from a bottom outlet duct 16 to an evaporator (not shown). The evaporator used in pilot plant experiments is a rotary evaporator (Buchi-Rotavapor-R) in which the ethanolic malt extract is concentrated under reduced pressure at approximately 40° C. For semi-industrial use, a Turba-Film evaporator Model 04-012 (available from Votaros Corporation) may be used.

Extraction of ground malt with 95% ethanol at 50° C. produces an antifoaming agent which is food compatible by all criteria.

The concentrated extract is suspended in water. The yield of food-compatible antifoam extract using the above method was 2.0–2.5%. In a typical experiment, 20.16 g of extract was obtained from 1 kg of ground malt. The antifoaming agent produced by the ethanolic extraction of ground malt is estimated to be 5 times more active than an agent produced from spent grains as measured by foam height. The agent contains predominantly unsaturated fatty acids and some phenolic compounds and lipoproteins.

In order to use it as an antifoaming agent, the extract is suspended in ten times its volume of water using (in the laboratory) a Deluxe mixer Model S-820 (available from Scientific Products) or any heavy duty mixer. For example, 25 g of extract is suspended in 250 ml of water. The antifoaming agent is applied to fermenting wort in aqueous suspension using an air atomizer-type sprayer. The amount of food compatible antifoaming agent to be added to a fermenting wort depends on the surface area of the fermenter. In general, from 0.5 to 5 mg of dry agent is used per liter of fermenting wort. For example, a 25 liter fermenter having a surface area of 30 cm$^2$ requires approximately 75 mg of dry agent applied by the spraying of 1 ml of aqueous suspension. If the fermenter has a surface area of 15 cm$^2$ and a volume of 25 liters, the quantity of aqueous suspension of antifoaming agent will be 0.75 ml.

On a commercial scale, only 25% of the ground malt could be extracted with alcohol and introduced into the mash, because higher proportions would drastically impair the conversion. It is worth noting that the extraction of only a small portion e.g. 25% of the ground malt used in a fermentation produces sufficient antifoaming agent to control foaming in several fermenters. When subjected to oxidation, the antifoaming activity of the ethanolic extract is greatly reduced. An advantage of extracting at least a part of the ground malt with ethanol is the reduction in the trans-2-nonenal precursors formation.

The concentration of the ethanol used in the extraction should be over 75%. The use of 50–75% ethanol resulted in a sticky mass from which the solvent could not be recovered. The use of other polar solvents such as propanol or acetone (which are not food compatible) does not provide better results and the enzyme inhibition is similar to that caused using ethanol. Hot methanol cannot be used for malt extraction because of its low boiling point, and because it is not food compatible. Moreover, methanol used to extract malt at room temperature yields are extract low efficiency.

Separation of hot ethanol from the ground malt is simple. The ethanol can be recovered from the fermentation gas and regenerated in the same distillation apparatus. An estimated 5% loss of solvent can be expected and the ethanol recovered from fermentation would be sufficient to offset such loss.

The speed of fermentation is controlled by several factors, including pitching rate, the quantity of yeast in suspension, the amount of carbon dioxide in solution and the sterol concentration. The sterol formation is partially controlled by the presence of lipids and lipoproteins. Moreover, the presence of sterol increases ester formation. The time for the fermentation of wort can be reduced by keeping yeast in suspension and promoting the escape of $CO_2$ by stirring or vibrating the fermenting wort. Carbon dioxide has an inhibitory effect on fermentation. An advantage of the anti-foaming agent is a dispersing action and control of the foam head, particularly during the active fermentation.

The vibrator used in the fermentation may be similar to those used in pouring cement. Such a vibrator is easy to operate, requires little energy input as compared to mechanical stirrers and is microbiologically acceptable.

In experiments, fermentations were carried out in an all glass "Unitank" type 25 L fermenter with a vibrator mounted 2 inches from the bottom. The ethanolic extract of ground malt was used as the anti-foaming agent, and the vibrator was operated continuously from the start of the fermentation. A high gravity wort was end-fermented in 4 days. A control wort fermented under the same conditions without vibration took 6 days to reach end-fermentation. Additional experiments with the vibrator proved that low frequency vibration (below 2000 vibrations/minute) was more effective than high frequency vibration in promoting the escape of carbon dioxide from the fermenting wort.

Experimental ale and lager fermentations carried out in pilot plant fermenters showed an average two day shorter fermentation cycle, a higher bitter units and no differences in foam retention of the finished beer when the fermentation is conducted with the vibrator and the anti-foaming agent.

In a commercial fermenter, upper and lower foam sensors would be used, the lower foam sensors being used to cut off the addition of anti-foaming agent. The anti-foaming agent is sprayed onto the surface of the fermenting wort, with one or more low frequency vibrators installed near the bottom of the fermenter. Logically, the anti-foaming agent is added automatically when foam reaches the upper sensor.

Upon completion of the fermentation, the anti-foaming agent is separated by filtration. The anti-foaming agent added is used up, and no harm is done even if it is not used since the agent constitutes a normal constituent of beer.

At least in theory, the anti-foaming agent of the present invention can be used in any microbiological fermentation, e.g. in the production of yeast or antibiotics.

We claim:

1. A process for producing an agent for reducing foaming during fermentation comprising the steps of grinding malt; extracting the ground malt thus produced with a hot ethanol solution having an ethanol concentration in excess of 75% to yield extracted ground malt and an ethanolic extract; separating said ethanolic extract from ground malt remaining therein; and concentrating said ethanolic extract to yield said antifoaming agent.

2. A process according to claim 1, wherein said ground malt is extracted with an ethanol solution containing 95% ethanol at 50° C.

3. A process according to claim 2, wherein the extraction is a counter-current, screw-type extraction.

4. A process according to claim 1, wherein said ethanolic extract is separated from ground malt using a vibrating screen separator, and the ethanolic extract is concentrated by evaporation under reduced pressure.

5. A process according to claim 4, wherein the evaporation is effected at approximately 40° C.

6. A process according to claim 1, wherein the concentrated ethanolic extract is placed in aqueous suspension for application to fermenting wort.

7. An anti-foaming agent for reducing foaming during fermentation produced by the process of claim 1.

* * * * *